United States Patent [19]

Vaidettaro

[11] 3,890,846

[45] June 24, 1975

[54] UHF TUNER COMPOSITE DIAL MOUNTING ARRANGEMENT

[75] Inventor: Alarico A. Vaidettaro, Bloomington, Ind.

[73] Assignee: Sarkes Tarzian, Inc., Bloomington, Ind.

[22] Filed: May 24, 1973

[21] Appl. No.: 363,589

[52] U.S. Cl. ............ 74/10.41; 74/10.54; 116/124.1

[51] Int. Cl. ......................... F16h 35/18; H03j 1/14

[58] Field of Search ......................... 74/10.41, 10.54; 116/124.1, 124.4

[56] References Cited

UNITED STATES PATENTS

| | | | |
|---|---|---|---|
| 3,307,414 | 3/1967 | Naber et al. | 74/10.41 |
| 3,365,962 | 1/1968 | Smith | 116/124.4 X |
| 3,774,459 | 11/1973 | Valdettaro | 74/10.41 |
| 3,788,152 | 1/1974 | Miner | 74/10.41 |

*Primary Examiner*—Allan D. Herrmann
*Attorney, Agent, or Firm*—Mason, Kolehmainen, Rathburn & Wyss

[57] ABSTRACT

In a 70 position detented UHF tuner, the tens dial sleeve on which an elongated tens dial member may be mounted is itself maintained coaxial with the station selector shaft by providing a conically shaped bearing seat on the selector shaft and a complementary mating conical surface on the forward end of the tens dial sleeve, a coil spring being provided to urge these two mating surfaces into engagement so that an elongated tens dial member having an end glange on which the tens digits are inscribed may be employed without causing misalignment of the respective tens and units digit of a given composite UHF channel number.

5 Claims, 7 Drawing Figures

UHF TUNER COMPOSITE DIAL MOUNTING ARRANGEMENT

The present invention relates to UHF tuners, and, more particularly, to UHF tuners of the type which employ a composite digital dial arrangement for indicating the channel number of each one of the seventy UHF television stations.

Various arrangements have been heretofore proposed for providing a UHF digital dial indication of the UHF channel to which the tuner is tuned. For example, in my copending applications Ser. No. 174,722 filed Aug. 25, 1971, and Ser. No. 233,148 filed Mar. 9, 1972, now U.S. Pat. No. 3,774,459, digital UHF dial arrangements are disclosed wherein the UHF channel number is made up of a composite of a units dial member bearing ten equally spaced units digits and a tens or decade dial member bearing equally spaced tens digits corresponding to the active UHF stations, i.e., digits 1 to 8, inclusive. While such composite dial arrangements are generally satisfactory for their intended purpose, under some circumstances the dial bearing the tens digits of the composite number may become misaligned by an amount sufficient to make the composite number difficult to read and cause confusion to the operator as to just what UHF station is being tuned. Thus, in the situation where tens and units dial members in the form of elongated sleeves are employed with end flanges which bear the tens and units digits, a very slight tilting of the axis of the tens dial sleeve in the area in which it is mounted on the selector shaft can cause a substantial misalignment of the tens digit with respect to the units digit in a given composite number.

It is, therefore, a primary object of the present invention to provide a new and improved composite digital dial mounting arrangement for a UHF tuner wherein the tens and units digits are maintained in exact alignment as different UHF television stations are selected by manipulation of the station selector shaft of the tuner.

It is another object of the present invention to provide a new and improved composite digital dial arrangement for UHF tuners wherein the tens dial sleeve is maintained in exact coaxial alignment with the units dial sleeve so that misalignment of the tens digits of the composite number with respect to the units digits of the composite number is positively prevented.

It is a further object of the invention to provide a new and improved mounting arrangement for the composite digital UHF dial which is extremely simple and economical to manufacture and may be readily produced on a mass production basis.

Briefly, in accordance with one aspect of the invention, the tens dial sleeve on which an elongated tens dial member may be mounted is itself maintained coaxial with the station selector shaft by providing a conically shaped bearing seat on the selector shaft and a complementary mating conical surface on the forward end of the tens dial sleeve, a coil spring being provided to urge these two mating surfaces into engagement so that an elongated tens dial member having an end flange on which the tens digits are inscribed may be employed without causing misalignment of the respective tens and units digit of a given composite UHF channel member.

The invention, both as to its organization and method of operation, together with further object and advantages thereof, will best be understood by reference to the following specification taken in connection with the accompanying drawings in which.

Figures 1, 2, 3:
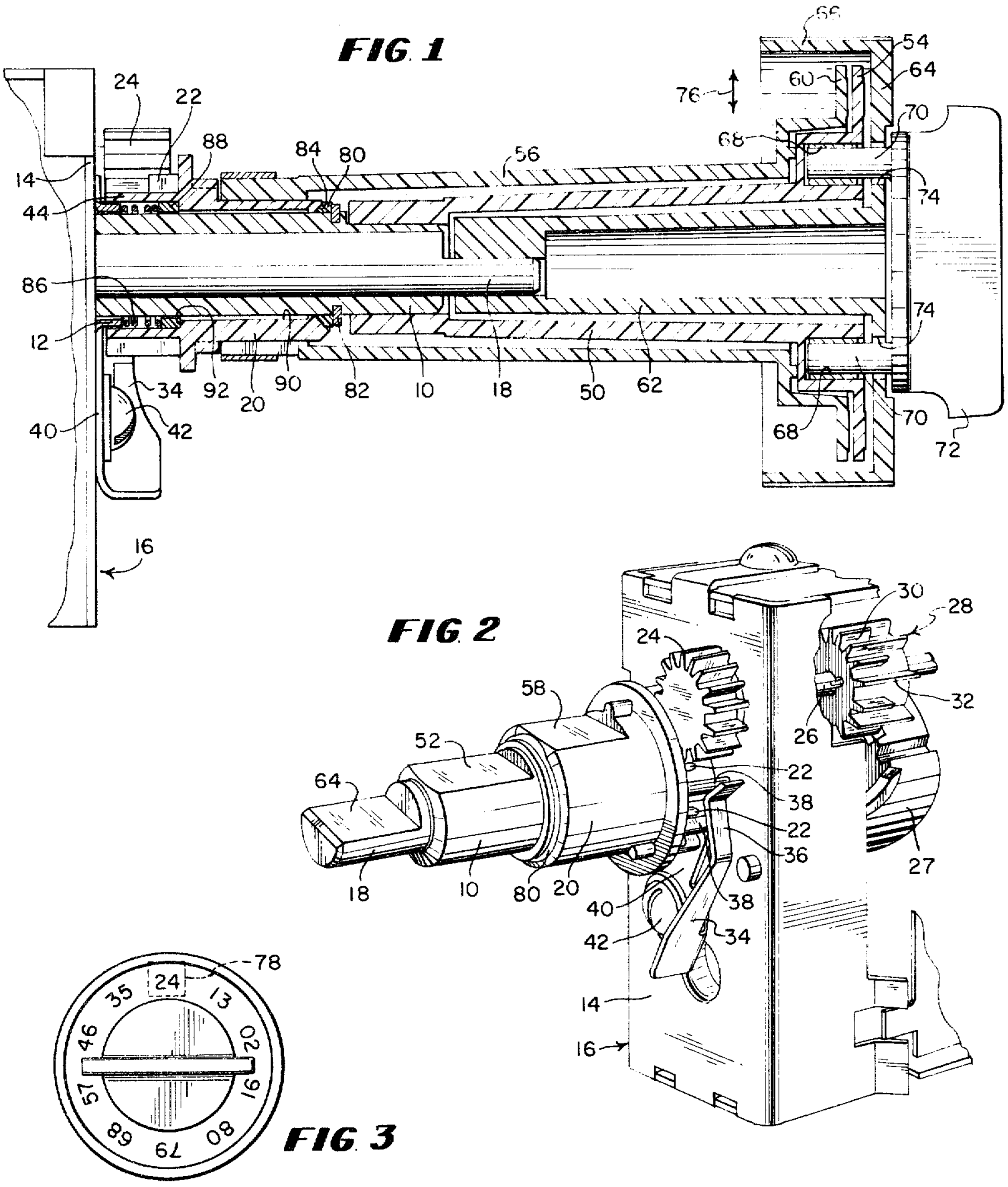
FIG. 1 is a sectional view of a UHF tuner composite digital dial mounting arrangement in accordance with the present invention.
FIG. 2 is a perspective view of a portion of the tuner of FIG. 1 shown with the UHF dials and tuning knobs removed.
FIG. 3 is a front view of the dial indicator arrangement of FIG. 1.
Figure 4:
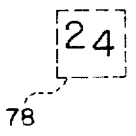

FIGS. 4 to 7, inclusive, are front views of a single channel number within the display area illustrating the manner in which the tens digit can become misaligned with respect to the units digit in prior art arrangements.

Referring now to the drawings, the composite digital dial mounting arrangement of the present invention is shown therein in conjunction with a UHF tuner the station selector shaft of which is indicated at 10. The station selector shaft 10 is journaled at its front end within an outwardly extending flange portion 12 formed in the front plate 14 of the front mounting bracket 16 of the tuner structure. A fine tuning shaft 18 is positioned inside of the station selector shaft 10. A tens dial sleeve member 20 is provided concentric with the station selector shaft 10 and a series of gear teeth 22 are formed integrally with the sleeve 20 at the rear end thereof, the teeth 22 being in engagement with the teeth of a gear 24 which is mounted on a shaft 26 which extends through the front wall 14 of the front mounting bracket 16. Another gear indicated generally at 28 is loosely mounted on the shaft 26 for rotation therewith, the gear 28 being provided with a first series of relatively closely spaced short gear teeth 30, alternate ones of the gear teeth 30 being elongated to provide the gear teeth extension portions 32.

The arrangement described thus far is substantially identical to a UHF tuner arrangement shown and described in more detail in copending Valdettaro application Ser. No. 233,148 filed Mar. 9, 1972, now U.S. Pat. No. 3,774,459, and reference may be had to said copending Valdettaro application for a detailed description of the actual construction of the tuner mechanism and its associated drive mechanism. However, for the purposes of the present invention, it may be stated that the station selector shaft 10 is provided with a detent mechanism so that it is detented at ten equally spaced positions during one revolution of the shaft 10. A counter stop mechanism is employed which includes a counter stop member 27 carried by the selector shaft 10 which is effective to move the gear 28 a predetermined increment by engagement with the elongated gear teeth 32, such incremental motion being accomplished one increment for each full rotation of the selector shaft 10. Accordingly, each time the selector shaft 10 is rotated through a complete revolution, the gear 28 is moved by a predetermined increment and since the gear 24 is also keyed to the shaft 26, the gear 24 is likewise moved by such predetermined increment for each revolution of the selector shaft 10. Each incremental movement of the gear 24 produces a corresponding incremental movement of the tens dial sleeve 20. However, since the gears 24 and 28 are somewhat loosely positioned on the shaft 26, a tens dial sleeve detent arrangement is provided in the form of a spring arm 34 which is provided with a V-shaped end portion 36 in engagement with elongated gear teeth 38 which are extensions of alternate ones of the gear teeth 22 on the dial sleeve member 20. The spring arm 34 is connected to a right angle base portion 40 which is secured to the front bracket 14 by means of the screw 42. Accordingly, the tens dial sleeve 20 is accurately detented at each tens digit position of the sleeve 20, these positions being produced by the above described incremental movement of the gear 24, one increment for each revolution of the detented selector shaft 10.

The rear end portion 44 of the tens dial sleeve 20 is arranged to fit over the outwardly extending flange portion 12 of the bracket 16 so as to maintain the rear end of the sleeve 20 generally centered and to absorb the side thrust exerted by the spring arm 34 on the teeth 38. However, any substantial play between the tens dial sleeve 20 and the selector shaft 10 at the forward end of the sleeve 20 may cause an undesired misalignment of the tens and units digits in the composite dial number. This situation becomes particularly undesirable in situations where elongated dial members are employed for the tens and units dials of the composite number and in situations where the dial numbers themselves are relatively small so that misalignment errors are more obvious.

Such elongated dial members are shown in FIG. 1 wherein a units dial member 50 is secured to the selector shaft 10 by means of the flat 52 and is provided with an outwardly extending flange portion 54 at the outer end thereof which bears the 10 equally spaced units digits corresponnding to the 10 detent positions of the station selector shaft 10. In a similar manner, an elongated tens dial member 56 is secured to the tens dial sleeve 20 by means of the flat 58 and is provided with an outwardly extending flange portion 60 at the forward end thereof on the forward face of which the tens digits may be inscribed by any suitable means, a particular tens digit being viewed with one of the units digits on the flange 54 through the surrouunding transparent portion of the flange 54 to form the composite UHF channel number. An elongated fine tuning knob 62 is secured to a flat 64 on the central fine tuning shaft 18 and is provided with a transparent outwardly extending flange portion 64 to which is connected an outer rim portion 66 which extends over and protects the tens and units dial flanges 60 and 54, respectively, the tens and units digits being viewed through the transparent portion 64 of the fine tuning knob 62. The knob 62 is also provided with a pair of openings 68 therein which are adapted to receive the rearwardly extending pin portions 70 of a station selector knob 72, the pin portion 70 extending through arcuate slots 74 in the flange portion 64 of the fine tuning knob 62 so as to permit limited movement of the fine tuning knob relative to the station selector knob 72, as described in detail in said copending Valdettaro application Ser. No. 233,148.

Figure 5:
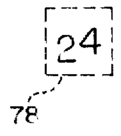
Figure 6:
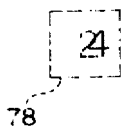
Figure 7:
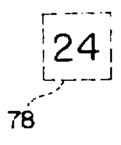

In the arrangement described thus far, any substantial play between the forward end of the dial sleeve 20 and the selector shaft 10 will be accentuated in viewing the composite UHF channel number because of the elongated dial members employed. Thus, even a slight amount of play between the members 20 and 10 at the forward end of the member 20 produces a substantial motion in a plane perpendicular to the axis of the selector shaft 10, i.e. in the direction of the arrow 76 shown in FIG. 1 or in a direction into the plane of the paper. Such variation in the position of the tens digit relative to the units digit of a composite number is illustrated in FIGS. 4 to 7, inclusive, wherein it is seen that a substantial misalignment of the two digits can occur due to the above-described play between the members 20 and 10. Thus, referring to FIG. 4 a situation is shown wherein the tens digit "2" which is visible within the viewing area 78, is raised upwardly with respect to the units digit "4". In FIG. 5 the opposite condition is shown wherein the tens digit 2 is depressed relative to the units digit 4. Similarly movement in the transverse direction is shown in FIGS. 6 and 7 wherein it is obvious that the tens digit 2 is misaligned with respect to its accompanying units digit "24". In this connection it will be understood that the viewing area 78 may in some instances be defined by a suitable mask arrangement so that only the desired composite number corresponding to the UHF station being received is visible to the viewer. In any event, misalignment of the tens and units digits due to the above-described play between the members 10 and 20 may cause confusion to the operator and interfere with the proper selection of a particular UHF station.

In order to prevent the above-described misalignment of the tens and units digits in a composite number, and in accordance with an important feature of the present invention, an annular washer 80 is positioned on the selector shaft 10 and is prevented from forward movement along this shaft by means of the retaining washer 82. The annular washer 80 is provided with a rearwardly facing conical bearing surface 84 and the forward inner edge of the dial sleeve 20 is provided with a complementary mating surface of conical configuration. Furthermore, a coil spring 86 is positioned between the end of the flange 12 on the bracket 16 and an internal retaining washer 88 which is provided in the central bore 90 of the tens dial sleeve 20 and abuts an internal shoulder 92 formed therein. The spring 86 thus urges the tens dial sleeve 20 outwardly so that the conical mating surfaces on the forward end of the sleeve 20 and on the annular washer 80 are held in engagement. With this arrangement the sleeve 20 is constantly centered with respect to the selector shaft 10 by means of these conical mating surfaces as these members are rotated relative to one another and the axis of the tens dial sleeve 20 connot tilt with respect to the axis of the selector shaft 10. As a result, motion of the tens digit flange 60 in a plane perpendicular to the axis of the selector shaft cannot occur even though the dial members are of substantial length as shown in FIG. 1, with the result that the tens digit of a composite number remains in alignment with its companion units digit as different UHF channels are selected. The rear end of the tens dial sleeve 20 remains generally centered with respect to the selector shaft 10 due to the centering action of the flange 12 on the rear end 44 of the sleeve 20. Also, the retaining washer 88 is a relatively close fit with respect to the selector shaft 10 so as to maintain the rearward portion of the sleeve 20 in coaxial alignment with the shaft 10.

While there has been illustrated and described a single embodiment of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a UHF tuner of the type having a continuously variable main tuning shaft rotation of which is effective selectively to receive signals from all television stations in the UHF band, a selector shaft, a sleeve-like member generally concentric with and surrounding said selector shaft, and means for rotating said sleeve-like member a predetermined increment for each revolution of said selector shaft, the improvement comprising means for mounting said sleeve-like member so that it may be rotated by said predetermined increments without tilting of the longitudinal axis thereof with respect to said selector shaft, said mounting means including means defining an annular bearing seat on said selector shaft having an annular sloping bearing surface, and means urging said sleeve-like member into engagement with said bearing surface, thereby to maintain said sleeve-like member centered relative to said selector shaft as said member is rotated by said predetermined increments.

2. The arrangement of claim 1, wherein said bearing seat means comprises an annular member having a conical rearwardly facing bearing surface, and said sleeve-like member includes means defining a conical surface in the forward end thereof which is adapted to mate with said bearing surface.

3. The arrangement of claim 1, wherein said urging means comprises a coil spring positioned between said sleeve-like member and a fixed point.

4. In a UHF tuner the combination of, a selector shaft, a sleeve-like member generally concentric with and surrounding said selector shaft, means defining gear teeth adjacent one end of said sleeve-like member, a gear mounted in offset relation to said selector shaft and in engagement with said gear teeth on said sleeve-like member, means for rotating said gear a predetermined increment for each revolution of said selector shaft, and mounting means for said sleeve-like member which is effective to maintain the same concentric with respect to said selector shaft and without tilting of the longitudinal axis thereof as said gear is moved by said predetermined increments, said mounting means comprising an annular washer carried by said selector shaft and having a rearwardly facing conical bearing surface, means defining a mating conical surface on the forward end of said sleeve-like member, and a coil spring surrounding said selector shaft and in engagement with said sleeve-like member for urging said mating surface into engagement with said bearing surface.

5. The combination of claim 4, which includes a groove in said selector shaft, and a retaining washer positioned in said groove and arranged to act as a stop for said annular washer to prevent forward movement thereof when said coil spring urges said mating surface into engagement with said bearing surface.

* * * * *